Dec. 17, 1963     D. PIETROROIA     3,114,563
TRACKING APPARATUS FOR TRAILERS
Filed May 31, 1962     2 Sheets-Sheet 2
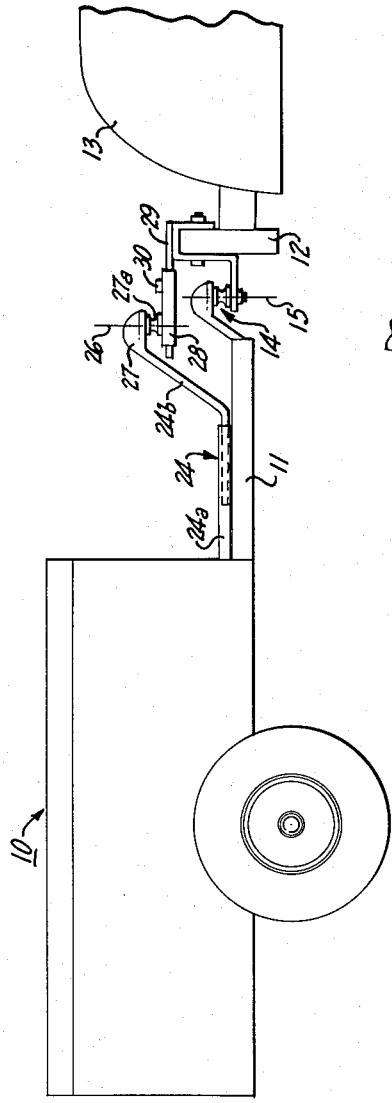
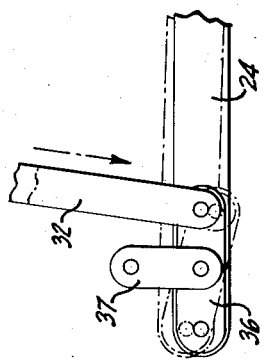
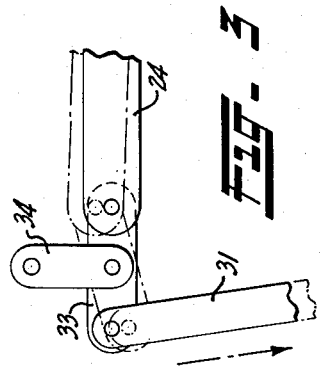
INVENTOR:
DOMINIC PIETROROIA
BY
Mellin and Hanscom
ATTORNEYS

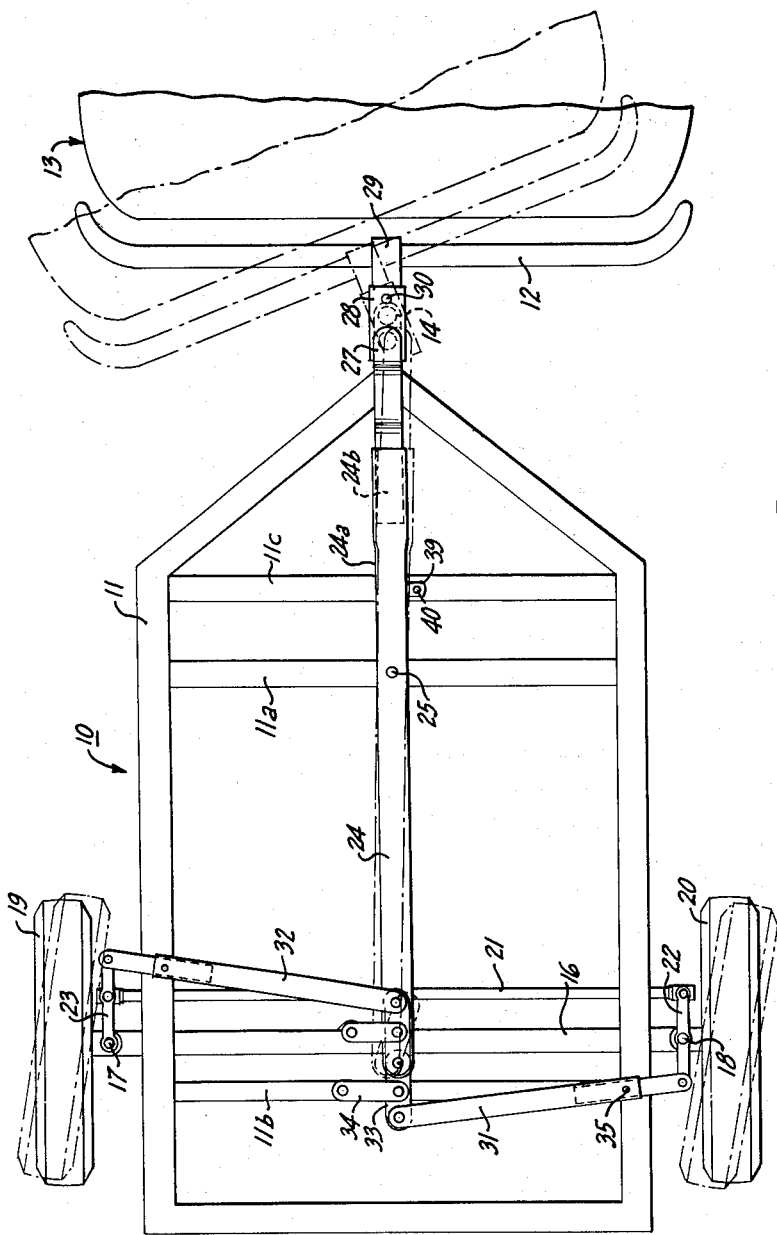

United States Patent Office 3,114,563
Patented Dec. 17, 1963

3,114,563
TRACKING APPARATUS FOR TRAILERS
Dominic Pietroroia, 130 30th Ave., San Mateo, Calif.
Filed May 31, 1962, Ser. No. 198,869
2 Claims. (Cl. 280—445)

This invention relates to towing apparatus for trailers and more specifically to devices for making a trailer track its towing vehicle and to trailer devices which may be used to effectively inhibit or prevent trailer jackknifing as the trailer is backed up.

Although many forms of apparatus have been provided for guiding a trailer responsive to the movements of a towing vehicle, it is a particular feature of the present invention to provide a control apparatus having but a single control member pivotally mounted to the towing vehicle upon a vertical pivot axis displaced from the pivot axis of the trailer coupling.

One object of the invention is to provide generally improved towing devices of the character referred to and to provide a towing device which overcomes many of the difficulties now encountered in the use of devices of this character.

A further object of the invention is to provide a towing device for trailers which is provided with a positive steering mechanism that may be used to cause the trailer to track a towing automobile or vehicle under all conditions.

Another object of the invention is to provide a towing device of the kind described and having means which allow the device to be used either for causing the trailer to track its towing vehicle or to prevent jackknifing of the trailer when it is being backed up.

A still further object of the invention is to provide a towing device of the kind described which permits a towed vehicle to be backed up as readily as the towing vehicle having the motive force.

A more specific object of the invention is to provide a steering and control apparatus for trailers having a frame and means for coupling the trailer to a towing vehicle upon a substantially vertical pivot, comprising means for supporting a trailer frame including an axle having pivots at opposite ends thereof for being mounted upon trailer wheels, and means for pivoting said trailer wheels responsive to angular pivotal movement between the trailer frame and its towing vehicle and comprising an extendible control member pivotally mounted to said trailer frame, means operated by movement of said control member for producing simultaneous pivoting of said support wheels, and means for pivotally connecting said control member to the towing vehicle upon a vertical pivot axis displaced from the pivot axis of the trailer coupling means to provide a moment arm of actuation.

Other objects of this invention will become apparent in view of the following detailed description and the accompanying drawings.

In the drawings forming a part of this application, and in which like parts are identified by like reference numerals throughout the same, FIG. 1 is a plan view of a trailer chassis connected to a towing vehicle and embodying the preferred form of this invention;

FIG. 2 is a side elevation of the trailer apparatus shown in FIG. 1;

FIG. 3 is an enlarged detail of a portion of the control mechanism shown in FIG. 1; and FIG. 4 is enlarged detail of another portion of the control mechanism shown in FIG. 1.

Referring to FIGS. 1 and 2 in particular, there is shown a trailer 10 having a frame 11 coupled to the bumper 12 of a towing vehicle 13 by means of a conventional coupling device 14. The coupling device 14 allows pivotal movement between the trailer and vehicle as the vehicle turns in the known manner and upon a substantially vertical axis 15, as indicated.

Trailer 10 is provided with an axle housing 16 having pivots 17 and 18 at opposite ends for being mounted upon trailer wheels 19 and 20, respectively. Trailer wheels 19 and 20 are adapted to be simultaneously pivoted upon the axes of pivots 17 and 18 by means of a connecting rod 21 pivotally secured to radial arms 22 and 23 of the wheel mountings.

The invention more particularly involves the provision of a control means for pivoting trailer wheels responsive to angular pivotal movement between the trailer frame 11 and the towing vehicle 13. For this purpose, there is provided an extendible control member 24 which is pivotally mounted to a cross member 11a of trailer frame 11 by a pivot 25, and the forward or leading end of member 24 is pivotally secured upon a vertical axis 26 by a coupling 27. Coupling 27 may be of conventional construction and identical to coupling 14. However, it is of utmost importance that the axis 26 of coupling 27 should be displaced from the pivot axis 15 of the trailer coupling means 14, as in the manner best shown in FIG. 2.

It will be further noted that coupling means 27 is adapted to be adjusted longitudinally toward or away from the bumper 12 for varying the distance between pivot axes 15 and 26 and consequently the moment arm of control member actuation, as will be described. The adjustability feature is provided by a sleeve 28 which can be rigidly pinned to a support bar 29 as with a set screw 30. Thus, the ball pivot 27a of the coupling 27 which is mounted to sleeve 28 can be adjustably positioned along the bar 29.

Referring to FIG. 1, the pivot axis 26 of coupling 27 is preferably aligned wtih the axis 15 of coupling 14 in a longitudinal direction relative to vehicle 13. This will provide an equal angle of movement of the control member 24 for equal angles of pivot to opposite sides between vehicle and trailer from a neutral position, which position is designated as the solid line relationships shown in FIG. 1.

Since the distance between axis 26 and the pivot 25 of control member 24 will be increased when the vehicle 13 occupies an angular position relative to the trailer (as shown by the broken lines of FIG. 1), the control member 24 is extendible, as above indicated.

It will be seen that control member 24 comprises a sleeve portion 24a which telescopically receives a forward rod 24b having the cup portion of coupling 27 mounted thereto. Accordingly, it will be evident that rod 24b may be freely extended from sleeve portion 24a when vehicle 13 is angularly positioned relative to trailer 10, as would occur during turning a corner.

Control member 24 is operatively connected to means for producing simultaneous pivoting of support wheels 19 and 20. This means includes the connecting rod 21 and further comprises a pair of extendible rods 31 and 32, and means such as a set pin for selectively pinning one of said extendible rods to prevent its extension or its telescoping movement.

Rod 31 is pivoted to a link connection 33 that is itself pivotally mounted upon a support pivot 34 which in turn is pivotally mounted to a cross support 11b of the trailer frame. Link 33 is also pivotally connected to the end of control member 24 as best shown in FIG. 3. Referring to FIG. 1, it will be noted that rod 31 is comprised of telescoping parts which may be selectively pinned by a pin or set screw 35; and in the event that set screw 35 is in place to prevent an extension or a telescoping of rod 31, then a pivotal movement of control member 24 upon axis 25 will impart pivotal movement to wheel 20 upon pivot 18. Of course, a corresponding and parallel movement is then transmitted to wheel 19 upon axis 17 by virtue of connecting rod 21.

Extendible rod 32 is constructed like rod 31, also having a pin or set screw 35 for preventing its extension or telescoping movement, and it is controlled by member 24 as an alternate method of operation. It will be understood in view of the following description that it is this rod which is to be operated to insure a proper tracking of the towing vehicle by the trailer during forward movement and at which time set screw 35 of rod 31 is removed or released. Rod 32 is pivoted to a link member 36 that is pivotally mounted upon a support pivot 37 and also pivotally connected to control member 24. Support pivot 37 may be mounted to the axle housing 16, or to another part rigid with frame 11.

Referring to FIG. 1, control member 24 is adapted to be made rigid with frame 11 in the event that it should be desired to retain wheels 19 and 20 in a neutral position at all times as when traveling upon a highway. For this purpose, an ear 39 is provided on member 24 at a position overlying the cross member 11c of frame 11, and the two parts may be pinned as by a pin 40. Assuming such a connection it is necessary to first release the coupling 27 in order to prevent actuating control upon turning the towing vehicle, since a connection at both pin 40 and a coupling of device 27 would be incompatible conditions of operation. For this reason, it may be desirable to use a pin type connection instead of the ball type coupling 27, and by using one pin 40 the control member 24 could be secured either at ear 39 or at the end thereof upon the pivot axis 26.

In one mode of operation, and during a time that the driver of the towing vehicle wishes to back up his trailer without producing uncontrollable jackknifing, the trailer apparatus would be connected by the couplings 15 and 27; set screw 35 of rod 31 would be secured in place while the control apparatus and trailing wheels are in a normal condition, the solid lines of FIG. 1, and pin 40 would be removed. If necessary the trailer and vehicle may be initially aligned so as to place all parts in the normal condition. Now, upon backing up the vehicle and assuming a tendency to producing jackknifing as suggested by comparing the broken lines of the bumper 12 and wheels 19 and 20 in FIG. 1, the control mechanism would produce a turning of wheels 19 and 20 so that the wheels would actually occupy the solid lines of FIG. 1, thereby inhibiting a jackknife and allowing the driver time and distance of movement in which to gain control of the trailer. It will be noted that during this operation control member 24 is being pivoted clockwise about its pivot 25 due to the angularity between the vehicle and trailer and the rod 31 is being pushed to pivot wheels 19 and 20 through an operation of link 33 upon pivot support 34. Although rod 32 is also acted upon by its link connection 36, the rod will not affect the movement of the wheels since the rod is not to be pinned, and accordingly may telescope with lost motion.

A second method of operation involves the loosening or removal of screw 35 from the extendible rod 31, and a subsequent pinning of the rod 32 by means of its screw to prevent lost motion. This connection would be a great utility for insuring a proper tracking of the vehicle by the trailer during normal forward movement, and especially during city driving where sharp turns are often unavoidable. Referring to FIG. 1 again, and assuming the vehicle shown in solid lines makes a left turn, thereby being moved into the broken line position shown while trailer 10 is yet in a position shown by solid lines, the control mechanism by reason of the pivotal movement of control member 24 into the broken line position will produce a turning of wheels 19 and 20 into their broken line positions shown. Although rods 31 and 32 are both maneuvered, only rod 32 is conditioned for operating the wheels by virtue of its being pinned and non-extendible. Rod 31 is, of course, then free to be telescoped or extended during the actuation of the wheels.

A third condition of operaton might be used upon the highways or for ordinary driving wherein neither backing up a vehicle nor short cutting of corners is of a real problem. The control apparatus may at such times be altogether inhibited by locking the control member 24 to the frame 11 by means of the pin 40 placed through the ear 39 and a matable opening of the cross frame 11c. In this event, it will be necessary to release the coupling 27 to prevent binding upon the control member if angularity is produced between trailer and towing vehicle.

It is to be understood that the form of the invention herewith shown and described is to be taken as a preferred example thereof, and that various changes may be made in the shape, size and arrangement of certain parts without departing from the spirit of the invention or the scope of the attached claims, and each of such changes is contemplated.

What I claim and desire to secure by Letters Patent is:

1. A steering and control apparatus for trailers having a frame and means for coupling the trailer to a towing vehicle upon a substantially vertical pivot, comprising:
   (a) means for supporting a trailer frame including an axle having pivots at opposite ends thereof for being mounted upon trailer wheels;
   (b) and means for pivoting said trailer wheels responsive to angular pivotal movement between the trailer frame and its towing vehicle and comprising an extendible control member pivotally mounted to said trailer frame, means interconnecting said trailer wheels, means including a pair of extendible rods for connecting said control member to each of said wheels, means for selectively pinning one of said extendible rods to prevent lost movement and to operate said one rod through actuation of said control member, and means for pivotally connecting said control member to the towing vehicle upon a vertical pivot axis displaced from the pivot axis of the trailer coupling means to provide a moment arm of actuation.

2. The steering and control apparatus of claim 1 wherein said last named connecting means comprises a pair of pivot supports pivotally mounted to said trailer frame, a pair of actuating links pivotally mounted to respective pivot supports and pivotally connected to said control member and to one of said extendible rods.

References Cited in the file of this patent

UNITED STATES PATENTS

| | | |
|---|---|---|
| 1,364,563 | Lee | Jan. 4, 1921 |
| 2,174,136 | Patty | Sept. 26, 1939 |
| 2,258,678 | Elwood | Oct. 14, 1941 |
| 2,545,119 | Stratton et al. | Mar. 13, 1951 |
| 2,582,455 | Potter | Jan. 15, 1952 |